US011888679B2

(12) United States Patent
Grammel et al.

(10) Patent No.: US 11,888,679 B2
(45) Date of Patent: Jan. 30, 2024

(54) HYPOTHESIS DRIVEN DIAGNOSIS OF NETWORK SYSTEMS

(71) Applicant: Juniper Networks, Inc., Sunnyvale, CA (US)

(72) Inventors: Gert Grammel, Ditzingen (DE); Jayanthi R, Coimbatore (IN); Chandrasekhar A, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/032,799

(22) Filed: Sep. 25, 2020

(65) Prior Publication Data

US 2022/0103417 A1 Mar. 31, 2022

(51) Int. Cl.
*H04L 41/0631* (2022.01)
*H04L 41/069* (2022.01)

(52) U.S. Cl.
CPC ........ *H04L 41/0631* (2013.01); *H04L 41/069* (2013.01)

(58) Field of Classification Search
CPC ... H04L 41/0631; H04L 41/06; H04L 41/069; H04L 41/0677; H04L 2027/0034
See application file for complete search history.

(56) References Cited

U.S. PATENT DOCUMENTS 5,130,936 A * 7/1992 Sheppard ............ G06F 11/2257
702/123
5,381,417 A * 1/1995 Loopik .............. G01R 31/2846
714/724
6,154,849 A 11/2000 Xia
6,336,138 B1 1/2002 Caswell et al.
7,552,447 B2 6/2009 Uthe
(Continued)

FOREIGN PATENT DOCUMENTS

EP 1405187 A1 * 4/2004 .......... G06F 11/0709
EP 2961100 A1 12/2015
WO 2013/055760 A1 4/2013

OTHER PUBLICATIONS

Bjorklund, "YANG—A Data Modeling Language for the Network Configuration Protocol (NETCONF)," Internet Engineering Task Force (IETF), RFC 6020, Oct. 2010, 173 pp.
(Continued)

*Primary Examiner* — Hitesh Patel
*Assistant Examiner* — Vinh Nguyen
(74) *Attorney, Agent, or Firm* — Shumaker & Sieffert, P.A.

(57) ABSTRACT

An example method includes obtaining, by one or more processors, data indicating resource dependencies between a plurality of resources in a network and event dependencies between a plurality of network events and one or more of the plurality of resources; generating a Bayesian model based on resource types of the plurality of resources and event types of the plurality of network events; receiving an indication of a fault in the network; collecting fault data and generating, based on the Bayesian model and the fault data, a plurality of root cause hypotheses for the fault; ordering the plurality of root cause hypotheses based on respective root cause probabilities associated with the plurality of root cause hypotheses; and outputting the ordered plurality of root cause hypotheses.

20 Claims, 8 Drawing Sheets

(56) References Cited

U.S. PATENT DOCUMENTS

| | | | | |
|---|---|---|---|---|
| 7,945,817 | B1 * | 5/2011 | Usery | H04Q 3/0075 714/48 |
| 8,264,702 | B2 * | 9/2012 | St. Jacques, Jr. | G06F 11/0733 358/1.15 |
| 8,954,972 | B2 | 2/2015 | Lam et al. | |
| 10,148,506 | B1 | 12/2018 | Anburose et al. | |
| 10,200,248 | B1 | 2/2019 | Jiang et al. | |
| 10,200,252 | B1 | 2/2019 | Qin et al. | |
| 10,333,820 | B1 | 6/2019 | Wang et al. | |
| 10,516,761 | B1 | 12/2019 | A et al. | |
| 10,601,640 | B1 * | 3/2020 | Das | H04L 41/0654 |
| 10,970,143 | B1 | 4/2021 | Wade et al. | |
| 2004/0049509 | A1 | 3/2004 | Keller et al. | |
| 2004/0268335 | A1 | 12/2004 | Martin et al. | |
| 2005/0015217 | A1 * | 1/2005 | Weidl | G05B 17/02 702/185 |
| 2005/0091356 | A1 * | 4/2005 | Izzo | H04L 41/0609 709/223 |
| 2005/0137762 | A1 * | 6/2005 | Rother | G01D 21/00 701/31.4 |
| 2005/0262106 | A1 | 11/2005 | Enqvist | |
| 2005/0278273 | A1 | 12/2005 | Uthe | |
| 2006/0069805 | A1 * | 3/2006 | LeBlanc | H04L 63/10 709/245 |
| 2006/0248389 | A1 * | 11/2006 | Thaler | H04L 41/0659 714/26 |
| 2007/0233438 | A1 * | 10/2007 | Quimper | G05B 23/0278 703/6 |
| 2008/0021918 | A1 | 1/2008 | Rao | |
| 2008/0222287 | A1 | 9/2008 | Bahl et al. | |
| 2010/0115341 | A1 * | 5/2010 | Baker | H04L 41/16 714/37 |
| 2010/0138694 | A1 * | 6/2010 | Harrison | G06F 11/0739 714/26 |
| 2011/0231704 | A1 * | 9/2011 | Ge | G06F 11/0709 714/26 |
| 2011/0264424 | A1 * | 10/2011 | Miwa | G05B 23/0283 703/2 |
| 2011/0320874 | A1 * | 12/2011 | Shimada | G06F 16/90328 714/37 |
| 2012/0005532 | A1 * | 1/2012 | Li | G06F 11/0709 714/26 |
| 2013/0339515 | A1 * | 12/2013 | Radhakrishnan | H04L 41/142 709/224 |
| 2015/0003595 | A1 * | 1/2015 | Yaghi | H04M 3/5175 379/85 |
| 2015/0199226 | A1 | 7/2015 | Wu et al. | |
| 2016/0275202 | A1 | 9/2016 | Lee et al. | |
| 2017/0075744 | A1 * | 3/2017 | Deshpande | G06F 11/0709 |
| 2017/0102997 | A1 | 4/2017 | Purushothaman et al. | |
| 2017/0288940 | A1 | 10/2017 | Lagos et al. | |
| 2017/0359232 | A1 * | 12/2017 | Stoops | H04L 41/0686 |
| 2017/0366983 | A1 * | 12/2017 | Gunasekara | H04L 43/0811 |
| 2017/0372212 | A1 * | 12/2017 | Zasadzinski | H04L 41/0631 |
| 2017/0372323 | A1 * | 12/2017 | Stern | G06F 16/3344 |
| 2018/0039567 | A1 | 2/2018 | Rajagopalan et al. | |
| 2018/0054351 | A1 | 2/2018 | Bhandari et al. | |
| 2018/0069771 | A1 * | 3/2018 | Dade | H04L 41/0604 |
| 2018/0136987 | A1 | 5/2018 | He et al. | |
| 2018/0218264 | A1 * | 8/2018 | Renders | G06N 5/006 |
| 2018/0278496 | A1 | 9/2018 | Kulshreshtha et al. | |
| 2019/0081850 | A1 | 3/2019 | Nazar et al. | |
| 2019/0230003 | A1 * | 7/2019 | Gao | H04L 41/069 |
| 2019/0327154 | A1 | 10/2019 | Sahoo et al. | |
| 2020/0064797 | A1 * | 2/2020 | Hannon | H04L 63/104 |
| 2020/0136891 | A1 | 4/2020 | Mdini et al. | |
| 2020/0250559 | A1 * | 8/2020 | Dinh | H04L 41/40 |
| 2020/0409781 | A1 * | 12/2020 | Zhen | G06F 11/079 |
| 2021/0014103 | A1 * | 1/2021 | Zhang | H04L 41/0677 |
| 2022/0086036 | A1 * | 3/2022 | Wang | H04L 41/0631 |
| 2022/0286348 | A1 * | 9/2022 | Han | H04L 41/0677 |
| 2023/0047615 | A1 * | 2/2023 | Yamada | H04L 41/0672 |

OTHER PUBLICATIONS

Clemm et al. "A YANG Data Model for Network Topologies" Internet Engineering Task Force (IETF) RFC 8345, Mar. 2018, 57 pp.

Harrington et al., "An Architecture for Describing Simple Network Management Protocol (SNMP) Management Frameworks," Network Working Group, RFC 3411, Dec. 2002, 64 pp.

Schoenwaelder, "Common YANG Data Types" Internet Engineering Task Force (IETF), RFC 6991, Jul. 2013, 30 pp.

U.S. Appl. No. 16/731,372, filed Dec. 31, 2019, naming inventors Chandrasekhar et al.

U.S. Appl. No. 16/821,745, filed Mar. 17, 2020, naming inventors Jayanthi et al.

U.S. Appl. No. 16/946,994, filed Jul. 14, 2020, naming inventors Jayanthi et al.

U.S. Appl. No. 16/947,507, filed Aug. 4, 2020, naming inventors Chandrasekhar et al.

Enns, "NETCONF Configuration Protocol," Network Working Group, RFC 4741, Dec. 2006, 95 pp.

Piao et al., "Root Cause Analysis and Proactive Problem Prediction for Self-Healing," IEEE, 2007 International Conference on Convergence Information Technology(ICCIT 2007), Nov. 21-23, 2007, pp. 2085-2090.

Extended Search Report from counterpart European Application No. 20214726.0, dated May 25, 2021, 9 pp.

Dusia et al., "Recent Advances in Fault Localization in Computer Networks," IEEE Communications Surveys & Tutorials, May 18, 2016, pp. 3030-3051.

Response to Extended Search Report dated Apr. 6, 2022, from counterpart European Application No. 20214726.0 filed Sep. 27, 2022, 26 pp.

* cited by examiner

702

```
{
        topic model_bng {
        description "Models related to JUNOS Broadband Network Gateway (BNG)";
        synopsis "BNG based models";
        Probe_Function ping { >>> Probe function
                description "Ping probe";
                Path interface_to_vrf.py;
                Method map_interface;
                argument source {
                        mandatory;
        }
        argument destination {
                mandatory;
        }
        trigger errors{ >>> error condition
                synopsis "errors";
                description "Sets health based on error drops";
                term is-data-error-discard {
                        when {
                                increase percentage {
                                        value 80;
                                }
                        }
                        then {
                                status {
                                        color red;
                                        message "error";
                                }
                        }
                }
        }

        resource interface {
                type device-resource; >>> Type of the resource
                keys [ interface-name ];
                synopsis "Interface model";
                description "This model captures the Interface information";
                field interface-name {. >>>> Fields in the model
                        type string;
                        description "Interface Name";
                }
        }
```

```
resource LSP {
        type network-resource;
        keys [ name ];
        synopsis "LSP model";
        description "This model captures the VRF information";
        field name {
                type string;
                description "VRF Name";
        }
        Probe ping {
                Source source-endpoint;
                Destination target-endpoint >>>Probes associated with the model.
        }
        depends [{ >>>Dependency population
                resource-type: interface,
                Dependency-type: transient, >>>Transient dependency
                merge-strategy {
                        function interface-to-vrf;
                        argument intf_name "interface.$ interface-name ";
                        argument vrf_name " vrf. $ vrf-name ";
                }
        }]
}
}
```

FIG. 7B

HYPOTHESIS DRIVEN DIAGNOSIS OF NETWORK SYSTEMS

TECHNICAL FIELD

This disclosure relates to computer networks, and more particularly, to diagnosing network issues using hypotheses to guide the diagnosis.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication. These devices may provide information such as current status, error events, and resource usage information to application as an aid in analyzing network performance and for analyzing errors in the system. As an example, such information may be useful in determining that root cause of an error in the system.

The explosion in the number of Internet of Things (IoT) and the need for large data centers to host cloud and web applications create a need for mechanisms to effectively analyze, evaluate, and/or control complex, heterogeneous and distributed networks. Network systems tend to need distributed and fast diagnosis solution techniques to analyze dependent events. In complex networks, a breakdown in the underlying layer of the network may cause a large number of higher layer services to fail, which may or may not be directly connected to the failing component.

SUMMARY

This disclosure describes techniques for generating and evaluating root cause hypotheses that attempt to explain the cause for a fault or adverse event in a network. In some examples, a system, such as a network health monitor or controller, can construct or be configured with a Bayesian model based on resources and events defined for a network. The Bayesian model can be defined using resource types and event types rather than specific instances of resources and events. When a network fault occurs, the system applies the Bayesian model to provide a set of potential root cause hypotheses that explain fault data that is received for the fault, and the probability for each hypothesis in the set. The system may use probes that are defined for resources to disprove one or more hypotheses in the set. The system may in some cases then provide a user, such as a network administrator, an ordered set of remaining hypotheses that were not disproved by the probes, which the user can use to perform manual investigation and ameliorative actions to address the fault or adverse event in the network.

In one example, this disclosure describes a method that includes obtaining, by one or more processors, data indicating resource dependencies between a plurality of resources in a network and event dependencies between a plurality of network events and one or more of the plurality of resources; generating a Bayesian model based on resource types of the plurality of resources and event types of the plurality of network events; receiving an indication of a fault in the network; collecting fault data and generating, based on the Bayesian model and the fault data, a plurality of root cause hypotheses for the fault; ordering the plurality of root cause hypotheses based on respective root cause probabilities associated with the plurality of root cause hypotheses; and outputting the ordered plurality of root cause hypotheses.

In another example, this disclosure describes a device that includes a memory and processing circuitry configured to: obtain data indicating resource dependencies between a plurality of resources in a network and event dependencies between a plurality of network events and one or more of the plurality of resources; generate a Bayesian model based on resource types of the plurality of resources and event types of the plurality of network events; receive an indication of a fault in the network; collect fault data and generating, based on the Bayesian model and the fault data, a plurality of root cause hypotheses for the fault; order the plurality of root cause hypotheses based on respective root cause probabilities associated with the plurality of root cause hypotheses; and output the ordered plurality of root cause hypotheses.

In a further example, this disclosure describes a computer-readable storage medium having stored thereon instructions, that when executed, cause one or more processors to: obtain data indicating resource dependencies between a plurality of resources in a network and event dependencies between a plurality of network events and one or more of the plurality of resources; generate a Bayesian model based on resource types of the plurality of resources and event types of the plurality of network events; receive an indication of a fault in the network; collect fault data and generating, based on the Bayesian model and the fault data, a plurality of root cause hypotheses for the fault; order the plurality of root cause hypotheses based on respective root cause probabilities associated with the plurality of root cause hypotheses; and output the ordered plurality of root cause hypotheses.

The details of one or more techniques of the disclosure are set forth in the accompanying drawings and the description below. Other features, objects, and advantages of the invention will be apparent from the description and drawings, and from the claims.

BRIEF DESCRIPTION OF THE DRAWINGS

FIGS. 7A and 7B illustrate software definitions of resource type and probe attributes.

Like reference characters denote like elements throughout the text and figures.

DETAILED DESCRIPTION

Figure 1:
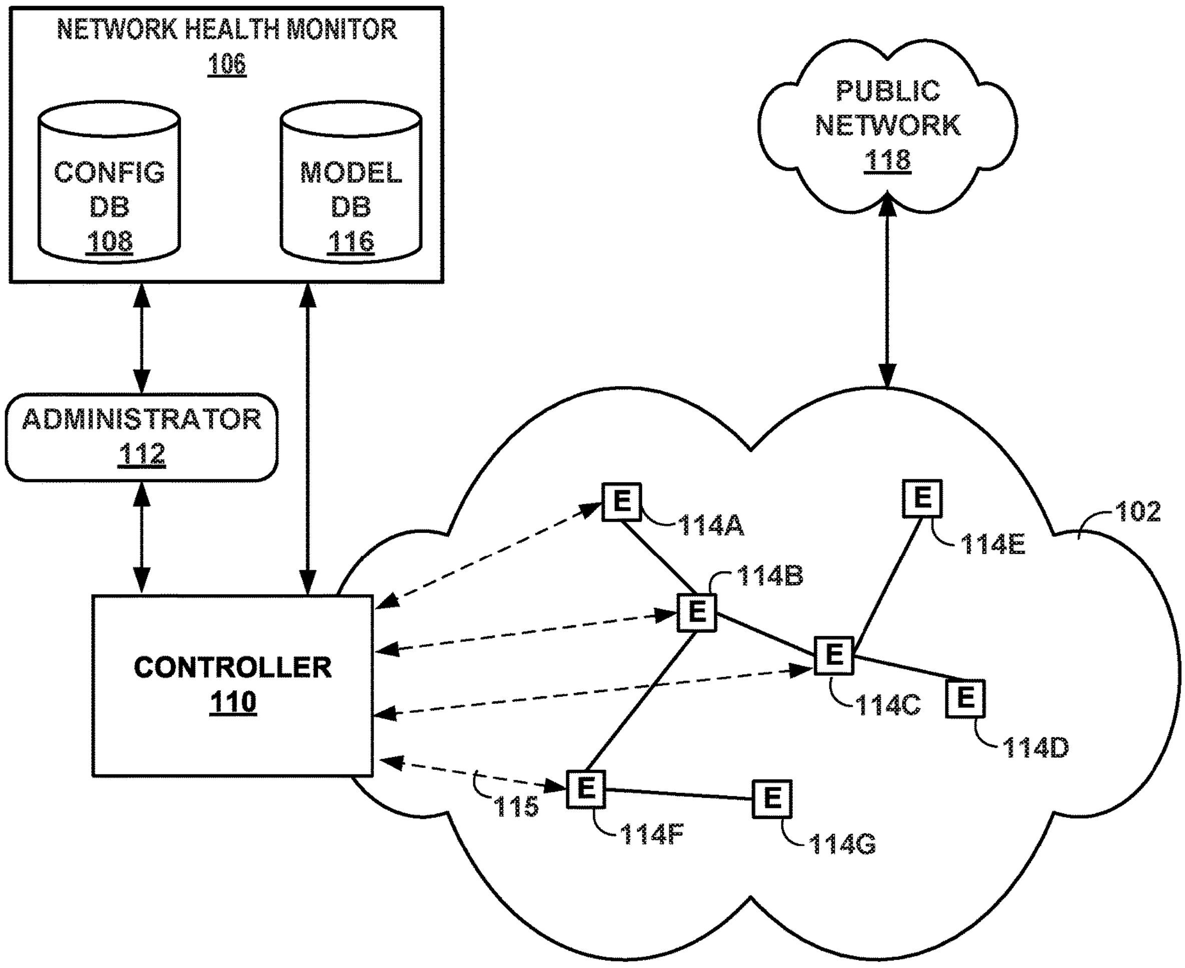
FIG. 1 is a block diagram illustrating an example network configured to perform hypothesis driven diagnosis in accordance with one or more aspects of the present disclosure.

Root cause analysis (RCA), also referred to as fault diagnosis, is a process to identify the initiating condition or event that triggers a network component failure from a set of possible candidate events/conditions that are generated or present within a discrete time window. RCA can be an important task for operators to maintain a properly functioning network. Various techniques that may be used to perform RCA include a model traversing technique and a dependency graph technique.

The model traversing technique can use object models to determine fault propagation. The network may be represented using various components and relationships between the components. Based on this model representing the network, fault dependencies can be inferred and used to identify the root cause of an issue. Model traversing techniques do not specify fault dependencies directly, but instead, derive the fault dependencies from the model during run-time. These techniques are suitable for a network that changes frequently. However, by themselves, model traversing techniques cannot deal with more complex fault propagation scenarios (e.g., model traversing techniques typically base fault propagation on an assumption that only one issue happens at a time, etc.).

The dependency graph technique uses a directed graph to model dependencies between the object events. Nodes represent network elements (e.g., devices such as network device and/or host devices). A directed edge from node A:event to node B:event indicates that the failures in node A can cause failures in node B. Dependency graphs are often used in networks with infrequent changes. In networks with frequent changes, the dependencies need to be updated frequently. As noted above, network complexity is increasing, particularly in light of the rapid increase in the number of connected devices, the relatively complex topology of distributed networks, and increasing internet of things (IoT) adoption. These factors also contribute to the heterogeneity of networks, due to the differences in device capabilities and configurations.

The size, complexity and heterogeneity of typical networks can cause graphs and models that represent the network to be similarly large and complex. Root cause analysis can be compared to determining an optimal move in a game of chess. Each piece can have multiple options to move, and each move can be followed by more optional moves, resulting in millions of possible moves during a game. Similarly, performing root cause analysis using such graphs or models can be even more complex in view of the number of possible options at each node in the graph or each object in the model. As a result, performing root cause analysis using model traversing techniques or dependency graph techniques on models and/or graphs that represent network configurations can be impractical due to the computing resources required to perform such analysis.

Techniques described herein may use a Bayesian model of a network. Nodes in the Bayesian model can represent resource types and event types rather than specific instances of resources and events. The Bayesian model may be initially created using playbooks and modified using other network models such as a resource dependency model and a diagnosis model. The Bayesian model can include probability values indicating the probability that a particular resource type is a root cause of a network fault. In other words, probability is associated with resource types rather than specific instances of a resource.

Modern data centers and/or networks are often evaluated, compared, and distinguished by reliability and service levels. In some cases, for data centers that provide networking and compute services for hire, data center customers tend to expect service level agreements ("SLAs") that obligate or guarantee data center performance for end-to-end services. Accordingly, dealing with failures or other events that may affect network performance and service SLAs can be important. Metrics such as Mean Time between Failures (MTBF) and Mean Time to Repair (MTTR) are sometimes used as the basis for SLAs. For data center providers bound by such SLAs, reacting quickly and accurately when detecting a failure of a network resource is particularly important.

A practical application of the techniques described herein includes a system that can automatically identify potential root causes of a network failure. Additionally, the system can receive input from a user to confirm a root cause or add new root causes. Thus, a further practical application of the techniques described herein is that the system can be trained to better predict root causes. The techniques described herein can provide technical advantages over current systems. For example, because there are fewer resource types than instances of resources of all resource types, the Bayesian model constructed as described herein using resource types is less complex that one based on instances of a resource. As a result, evaluation of potential root causes can be completed faster and with less computing resources than in systems that evaluate probabilities for every instances of a resource. This can reduce MTTR, a potential important factor in an SLA. Additionally, root cause observations can be applied across multiple instances of a resource type rather than applying only to an individual resource. This provides the advantage that observation can be leveraged across different instances of the same resource type.

FIG. 1 is a block diagram illustrating an example network configured to perform hypothesis driven diagnosis in accordance with one or more aspects of the present disclosure. Network 102 includes devices, components, or elements that may be managed using a control system or controller device, such as controller 110. In some examples, network 102 may be an enterprise network operated or managed by an enterprise or other organization. Managed elements 114A-114G (collectively, "elements 114") of network 102 include devices interconnected via communication links to form a communication topology enabling the exchange of resources and information. Elements 114 may be organized into one or more resource groups, and may include, for example, routers, switches, gateways, bridges, hubs, servers, firewalls or other intrusion detection systems (IDS) or intrusion prevention systems, computing devices, computing terminals, printers, storage devices, other network devices, or a combination of such devices. Devices coupled directly or indirectly to network 102 may transmit data as packets, frames, or according to any other discrete data unit defined by any other protocol, such as a cell defined by the Asynchronous Transfer Mode (ATM) protocol, or a datagram defined by the User Datagram Protocol (UDP). Communication links interconnecting elements 114 may be physical links (e.g., optical, copper, and the like), wireless links, or any combination thereof.

Network 102 is shown coupled to a public network 118 (e.g., the Internet) via a communication link. Public network 118 may include, for example, one or more client computing devices. Public network 118 may provide access to web servers, application servers, public databases, media servers, end-user devices, and other types of network resource devices and content.

Controller 110 may be communicatively coupled to elements 114. Controller 110, in some examples, forms part of a device management system, although only one device of the device management system is shown for ease of illustration in FIG. 1. Controller 110 may be coupled either directly or indirectly to the various elements 114. Once elements 114 are deployed and activated, administrator 112 may use controller 110 (or multiple such management devices) to manage devices using a device management protocol. One example device protocol is the Simple Network Management Protocol (SNMP) that allows controller 110 to traverse and modify management information bases (MIBs) that store configuration data within each of the managed elements 114. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at tools.ietf.org/html/rfc3411, the entire contents of which are incorporated herein by reference.

Controller 110, also referred to as a network management system (NMS) or NMS device, and elements 114 may be maintained by an information technology (IT) group of the enterprise. Administrator 112 may interact with controller 110 to remotely monitor and configure elements 114. For example, administrator 112 may receive alerts from controller 110 regarding any of elements 114, view configuration data of elements 114, modify the configurations data of elements 114, add new devices to network 102, remove existing devices from network 102, or otherwise manipulate network 102 and devices therein. Although described herein with respect to an enterprise network, the techniques of this disclosure are also applicable to other network types, public and private, including LANs, VLANs, VPNs, and the like.

In some examples, administrator 112 use controller 110 or a local workstation to interact directly with elements 114, e.g., through telnet, secure shell (SSH), or other such communication sessions. That is, elements 114 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 115 with one of elements 114, e.g., element 14F, using controller 110, to directly configure element 14F. In this manner, a user can provide commands in a format for execution directly to elements 114.

Further, administrator 112 can also create scripts that can be submitted by controller 110 to any or all of elements 114. For example, in addition to a CLI interface, elements 114 may also provide interfaces for receiving scripts that specify the commands in accordance with a scripting language. In a sense, the scripts may be output by controller 110 to automatically invoke corresponding remote procedure calls (RPCs) on the managed elements 114. The scripts may conform to, e.g., extensible markup language (XML) or another data description language.

Administrator 112 can use controller 110 to configure elements 114 to specify certain operational characteristics that further the objectives of administrator 112. For example, administrator 112 may specify for an element 114 a particular operational policy regarding security, device accessibility, traffic engineering, quality of service (QoS), network address translation (NAT), packet filtering, packet forwarding, rate limiting, or other policies. Controller 110 uses one or more network management protocols designed for management of configuration data within the managed network elements 114, such as the SNMP protocol or the Network Configuration Protocol (NETCONF) protocol, or a derivative thereof, such as the Juniper Device Management Interface, to perform the configuration. Controller 110 may establish NETCONF sessions with one or more of elements 114.

Network heath monitor 106 may monitor network 102 to determine if network 102 is experiencing issues such as faults, throughput problems or other network issues. Network health monitor 106 can use information received from controller 110, administrator 112 and from elements 114 to create or receive one or more data models of network 102 that may be stored in model database 116. As noted above, the data models may be used to describe elements in the network as well as dependencies between elements in the network. The data models may be used by network health monitor 106 in a hypothesis driven diagnosis to determine potential root causes of an event. For example, network health monitor 106 may receive event information indicating issues with network performance such as throughput issues or error conditions in network 102. Network health monitor 106 may use data models created by controller 110 along with data models created by network health monitor 106 to generate multiple hypotheses regarding the root cause of the issue. Network health monitor 106 can eliminate improbable hypotheses and select from among the remaining hypotheses, a most likely root cause based on a probability ranking of the remaining hypotheses.

Network health monitor 106 may use YANG modeling for data models stored in model database 116 and low-level device configuration models that may be stored in configuration database 108. This data may contain relations across YANG entities, such as list items and containers. As discussed in greater detail herein, controller 110 may convert a YANG data model into a graph data model, and convert YANG validations into data validations. YANG is described in (i) Bjorklund, "YANG—A Data Modeling Language for the Network Configuration Protocol (NETCONF)," Internet Engineering Task Force, RFC 6020, October 2010, available at tools.ietf.org/html/rfc6020, and (ii) Clemm et al., "A YANG Data Model for Network Topologies," Internet Engineering Task Force, RFC 8345, March 2018, available at the uniform resource location (URL) tools.ietf.org/html/rfc8345 (sometimes referred to as "RFC 8345"). Techniques for managing network devices using a graph model for high level configuration data are described in "Configuring And Managing Network Devices Using Program Overlay On Yang-Based Graph Database," U.S. patent application Ser. No. 15/462,465, filed on 17 Mar. 2017, the entire content of which is incorporated herein by reference.

Figure 2:
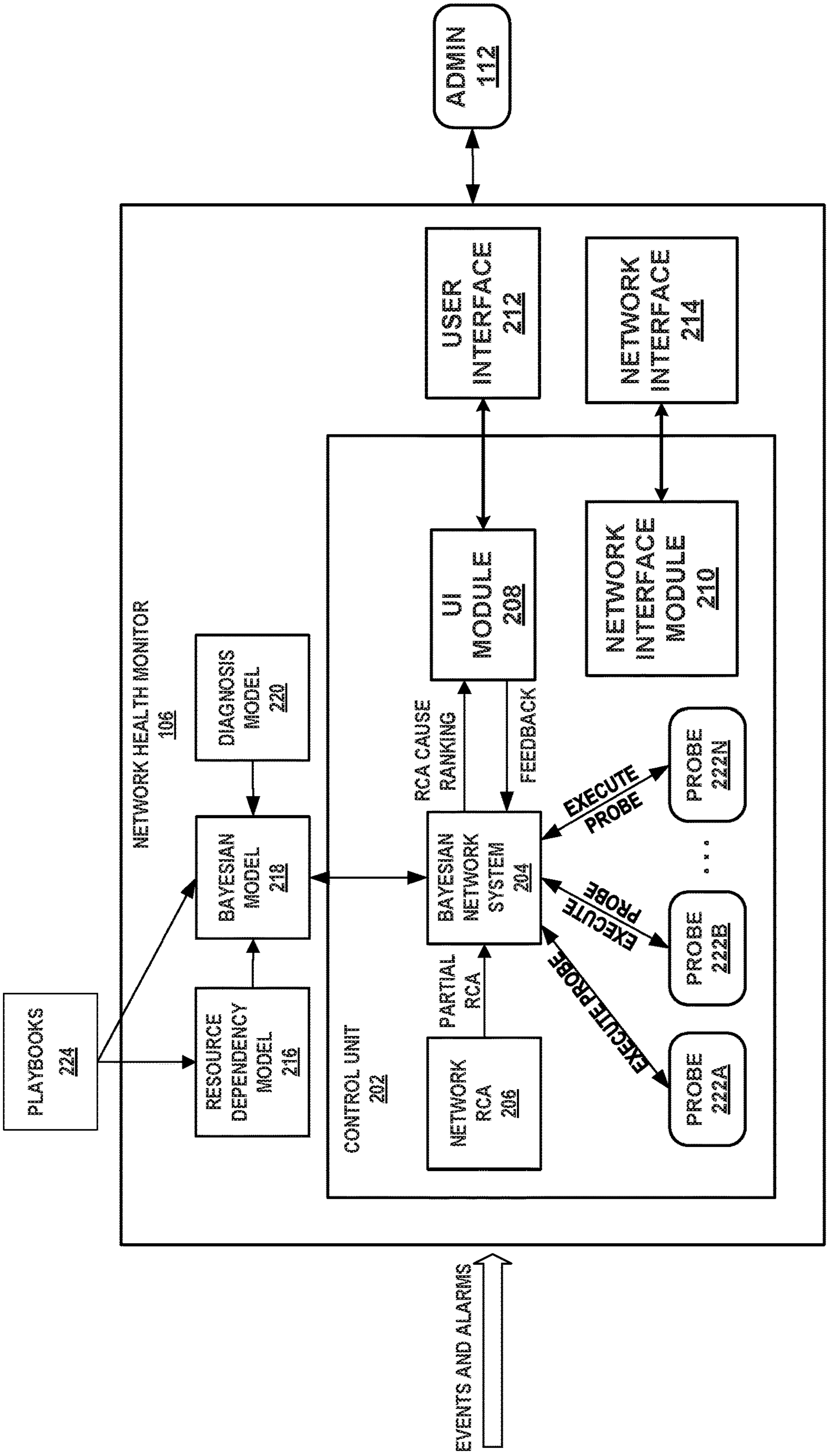
FIG. 2 is a block diagram illustrating an example network health monitor that may be used to perform root cause analysis, in accordance with one or more aspects of the present disclosure.

FIG. 2 is a block diagram illustrating an example network health monitor that may be used to perform root cause analysis, in accordance with one or more aspects of the present disclosure. In the example illustrated in FIG. 2, network health monitor 106 includes control unit 202, network interface 214, and user interface 212. The network interface 214 represents an example interface that can communicatively couple network health monitor 106 to controller 110 or other external devices, e.g., any of elements 114 of FIG. 1. The network interface 214 may represent a wireless and/or wired interface, e.g., an Ethernet® interface or a wireless radio configured to communicate according to a wireless standard, such as one or more of the IEEE 802.11 wireless networking protocols (such as 802.11 a/b/g/n or other such wireless protocols). Network health monitor 106 may include multiple network interfaces in various examples, although only one network interface is illustrated in the non-limiting example of FIG. 2.

Control unit 202 represents any combination of hardware, hardware implementing software, and/or firmware for implementing the functionality attributed to the control unit 202 and its constituent modules and elements. When control unit 202 incorporates software or firmware, control unit 202 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), fixed function circuitry, programmable processing circuitry, or any other equivalent integrated or discrete logic circuitry, as well as any combinations of such components. A processing unit is generally implemented using fixed and/or programmable processing circuitry.

User interface 212 represents one or more interfaces by which a user, such as administrator 112, interacts with network health monitor 106, e.g., to provide input and receive output. For example, the user interface 212 may represent one or more of a monitor, keyboard, mouse, touchscreen, touchpad, trackpad, speakers, camera, microphone, or the like. Furthermore, although in this example network health monitor 106 includes a user interface 212, administrator 112 need not directly interact with health monitor 106, but instead may access health monitor 106 remotely, e.g., via the network interface 214.

In the example illustrated in FIG. 2, control unit 202 executes network root cause analyzer 206, Bayesian network system 204, a user interface module 208, network interface module 210, and probes 222A-222N (referred to collectively as "probes 222") to perform root cause analysis for a network 102. Control unit 202 executes user interface module 208 to receive input from and/or provide output via user interface 212. Control unit 202 also executes network interface module 210 to send and receive data (e.g., in packetized form) via network interface 214. Network root cause analyzer 206, Bayesian network system 204, user interface module 208, network interface module 210, user interface module 208, and probes 222A-222N may be implemented as respective hardware units, or in software or firmware implemented by appropriate hardware infrastructure, or a combination thereof.

Bayesian network system 204 can create and maintain a Bayesian model 218 describing relationships between network resource types and event types, and root causes based on such dependencies. A Bayesian model may also be referred to as a Bayesian network, a Bayes network, a belief network, a decision network, a Bayes model, or a probabilistic directed acyclic graphical model. In some aspects, Bayesian model 218 is a probabilistic graph model that represents a set of variables and their conditional dependencies via a directed acyclic graph (DAG). A DAG is a graph with directed links and one which contains no directed cycles.

In some aspects, Bayesian network system 204 creates Bayesian model 218 based on information in resource dependency model 216 and diagnosis model 220. Resource dependency model 216 can be a graph model where nodes in the graph model represent network resources. The resources may include, for example, network services, hardware and/or software units, and tables of elements 114. A resource may be a physical resource or a logical resource that can generate alarms, events, or other types of fault data. Thus, the resources may include, for example, network tunnels (such as label switched paths (LSPs)), virtual private networks (VPNs), virtual routing and forwarding (VRF) tables, hardware interfaces, logical interfaces, or the like. Nodes in the resource dependency model 216 may represent resources and edges between nodes may represent dependencies. Dependency edges may be across device resources, across device resources to services, and across services. In some aspects, resource dependency model 216 may be programmable such that the model may be created and changed as resources and services change over time. In some aspects, resource dependency model 216 and/or Bayesian model 218 may be programmed by playbooks 224. Further details on the creation and maintenance of resource dependency model 216 may be found in U.S. patent application Ser. No. 16/947,507 entitled "USING A PROGRAMMABLE RESOURCE DEPENDENCY MATHEMATICAL MODEL TO PERFORM ROOT CAUSE ANALYSIS" filed Aug. 4, 2020, the contents of which is hereby incorporated by reference in its entirety.

Figure 3:
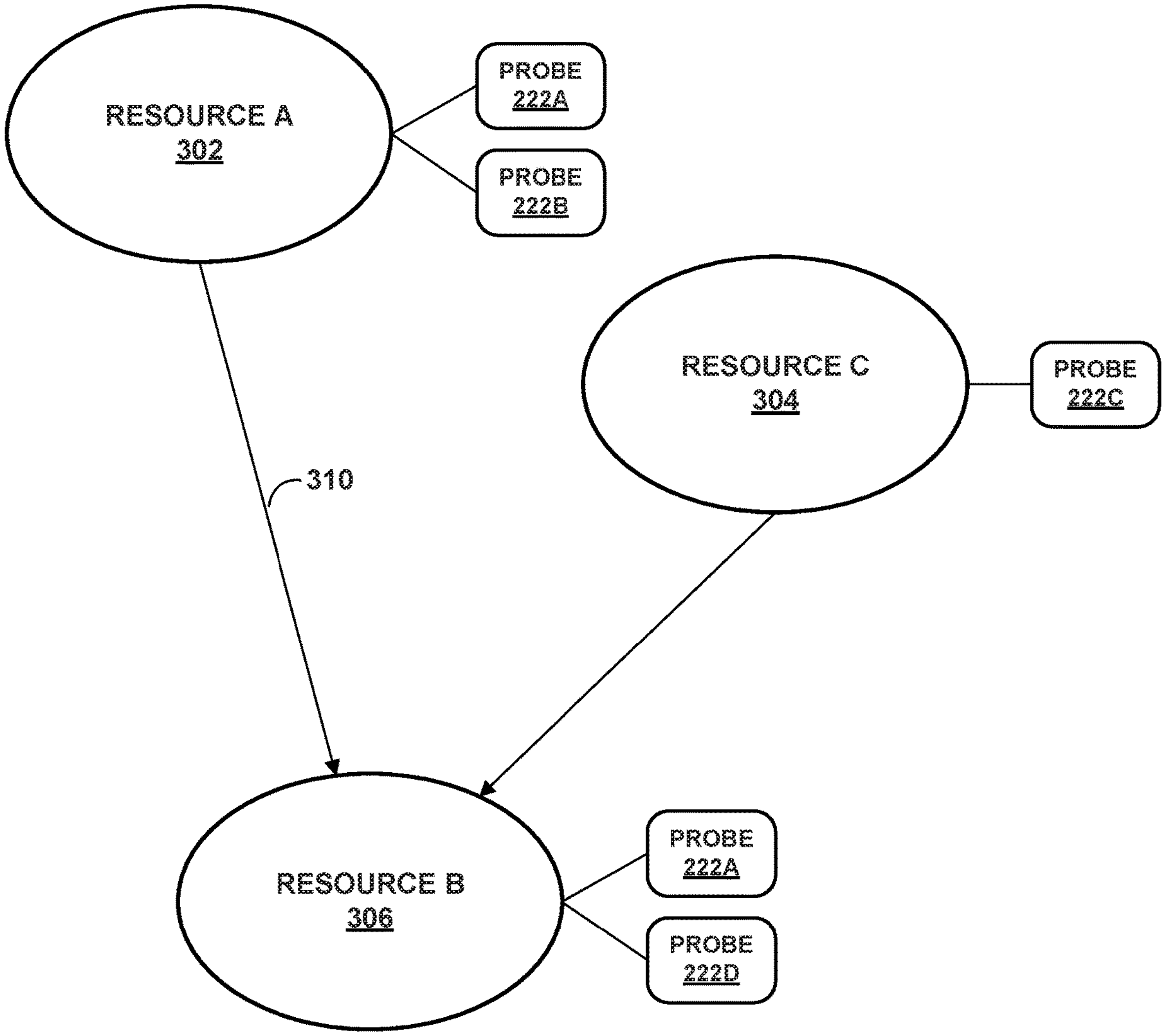
FIG. 3 is a conceptual diagram illustrating an example portion of a resource dependency model in accordance with one or more aspects of the present disclosure.

FIG. 3 is a conceptual diagram illustrating an example portion of a resource dependency model. In this example, the resource dependency model includes resource A node 302, resource C node 304, and resource B node 306. In some aspects, network health monitor 106 determines dependencies in inverse order:

Dependency (Resource)→[List of Resources]

Thus, using the resource dependency model of FIG. 3 as an example, if resource A uses resource B (as shown by edge 310 from resource A node 302 to resource B node 306), network health monitor may generate the following resource dependency model:

Dependency (ResourceB)→[ResourceA, ResourceC]

The resource nodes A 302, C 304 and B 306 each have probes 222 associated with the node. In some aspects, a probe 222 may be associated with a resource node in resource dependency model 216. A probe can be a software, firmware, or hardware module that can be programmed to perform operations to test the resource represented by the resource node. In some examples, a probe 222 can execute a ping command, perform Bidirectional Forwarding Detection (BFD), execute a "Traceroute" command, correlate counters associated with the resource or perform other operations designed to assess the operability of the resource associated with the resource node. Probes may involve message passing, querying a resource, obtaining a value, computing a value, and otherwise determining an operating condition of a resource. A threshold value may be associated with a probe. In some aspects, the threshold value may be a predetermined or configurable value. In some aspects, the threshold value may be automatically learned, for example, using a machine-learning algorithm. Bayesian network system 204 may use the thresholds to determine if the resources "passes" the test provided by probe 222. For example, a threshold value of 999 for a ping-based probe for a resource can specify that 999 of 1000 ping packets must be successfully returned from the resource in order for the Bayesian network system 204 to consider the resource to have passed the probe test. Similarly, a threshold value of 100 ms may specify that 99% of ping attempts must have a roundtrip time below 100 ms. For a probe based on BFD, a threshold of four (4) may specify that route information on a remote router resource needs to be up-to-date no later that four times the BFD time cycle.

In the example illustrated in FIG. 3, resource node A 302 is associated with probes 222A and 222B, resource node C 304 is associated with probe 222C, and resource node B 306 is associated with probes 222A and 222D. As illustrated in FIG. 3, the same probe (e.g., probe 222A) may be assigned to more than one resource node.

An example of XML code that includes data fields that define a resource node and a probe is provided in FIGS. 7A and 7B. In FIG. 7A, portion 702 of the XML code defines a probe labeled "ping" and defines the location (e.g., path) of the probe logic, the arguments, and the conditions that trigger an error for the probe. In FIG. 7B, portion 704 includes fields that define an LSP resource object. The definition of an LSP resource object in portion 704 includes association 706 that associates the ping probe with the LSP resource.

Figure 4:
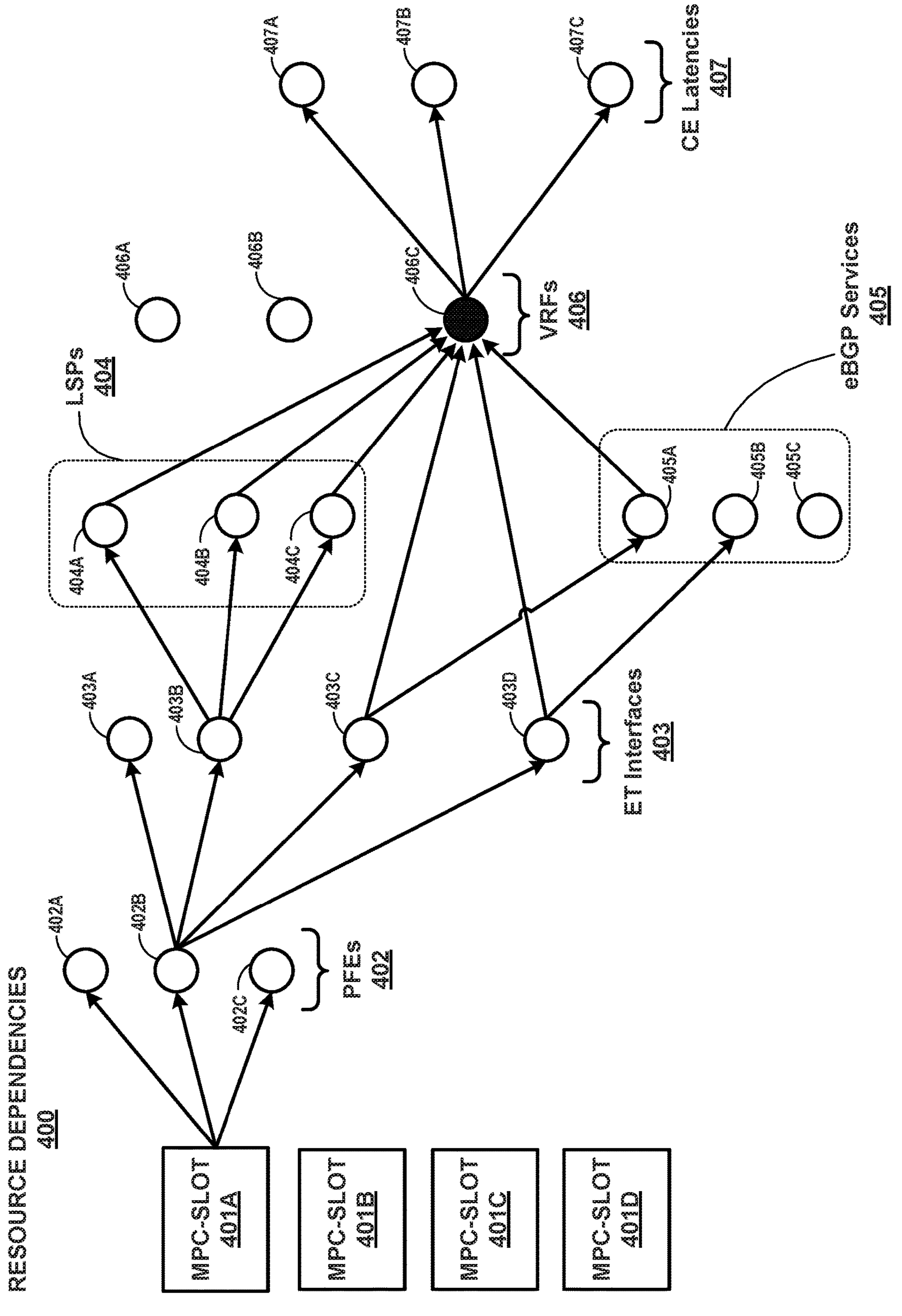
FIG. 4 is a conceptual diagram illustrating an example dependencies graph representing a resource dependency model in accordance with one or more aspects of the present disclosure.

FIG. 4 is a conceptual diagram illustrating an example dependencies graph 400 representing a resource dependency model in accordance with one or more aspects of the present disclosure. Dependencies graph 400 shows a resource group that has a number of layers of resources, including slots 401A, 401B, 401C, and 401D ("slots 401"), each of which may be one of many port concentrators or modular port concentrators associated with a network or network device. Also illustrated in FIG. 4 are PFE 402A through 402C ("PFEs 402"), Ethernet interface 403A through 403D ("interfaces 403"), label-switched path (LSP) 404A through 404C ("LSPs 404"), external Border Gateway Protocol (eBGP) service 405A through 405C ("eBGP services 405"), virtual routing and forwarding instance (VRF) 406A through 406C ("VRFs 406"), and customer edge devices or latencies 407A through 407C ("customer edge latencies 407"). Although a limited number of slots 401, PFEs 402, interfaces 403, LSPs 404, VRFs 406, customer edge latencies 407 are illustrated in FIG. 4, techniques described herein may apply to other networks with any number of such resources, or resources of other types.

Dependencies graph 400 may correspond to a resource dependency model of a network, such as network 102 described in connection with FIG. 1. Dependencies graph 400 illustrates dependencies across each set of instances, or across each layer (e.g., across slots 401 to PFEs 402). Any instance shown in dependencies graph 400 (e.g., any of PFEs 402, interfaces 403, LSPs 404, eBGP services 405, VRFs 406, and/or customer edge latencies 407) may experience a failure, malfunction, glitch, or other event that may impact the operation of a network. For instance, slot 401A and each of PFEs 402 have a dependency relationship, where an event affecting slot 401A may affect each of PFEs 402. Similarly, an event affecting PFE 402B may affect some or all of interfaces 403.

Returning to FIG. 2, diagnosis model 220 captures the cause and effect (sometimes referred to herein as "correlations") relationship between various resources. For example, diagnosis model 220 may reflect cause-and-effect relationships across events that occur over network 102. The events may be physical events or logical events that may be derived from physical events and/or network states. The cause and effect relationships are defined between resources and resource alarms/events. When the cause and effect relationship is defined between resources, an alarm or event on a resource causes an effect on "supporting resources." When the cause and effect relationship is defined between resources and resource alarms/events, an event on a resource causes an effect on a "supported resource" events. In some aspects, diagnosis model 220 may be a programmable diagnosis model, which may be implemented by a controller, such as controller 110 and provided to network health monitor 106 by controller 110. Details on the creation and use of an example programmable diagnosis model may be found in U.S. patent application Ser. No. 16/821,745 entitled "PROGRAMMABLE DIAGNOSIS MODEL FOR CORRELATION OF NETWORK EVENTS" and filed on Mar. 17, 2020, and U.S. patent application Ser. No. 16/946,994 entitled "FAILURE IMPACT ANALYSIS OF NETWORK EVENTS" and filed on Jul. 14, 2020, the contents of each of which is hereby incorporated by reference in its entirety.

As noted above, Bayesian network system 204 generates a Bayesian model 218 based on data in resource dependency model 216 and diagnosis model 220. Controller 110 may generate resource dependency model 216 and diagnosis model 220 for use by network health monitor 106, which may use the resource dependency model 216 and diagnosis model 220 to create Bayesian model 218. In some aspects, rather than including all resources and events in resource dependency model 216 and diagnosis model 220, Bayesian network system 204 can generate Bayesian model 218 based on a subset of the data in models 216 and 220. The subset of the data may represent a higher level abstraction of the resources and events in resource dependency model 216 and diagnosis model 220. As an example, Bayesian network system 204 can generate Bayesian model 218 based on the types of resources and types of events in resource dependency model 216 and diagnosis model 220 rather than instances of resources and events. For instance, Bayesian model 218 may include nodes that are abstract representations of resources. Thus, rather than include a node for every edge router in a system, a single edge router node may represent any of the different types of edge routers in a system, regardless of the manufacturer of the edge router or the version of edge router.

Figure 5:
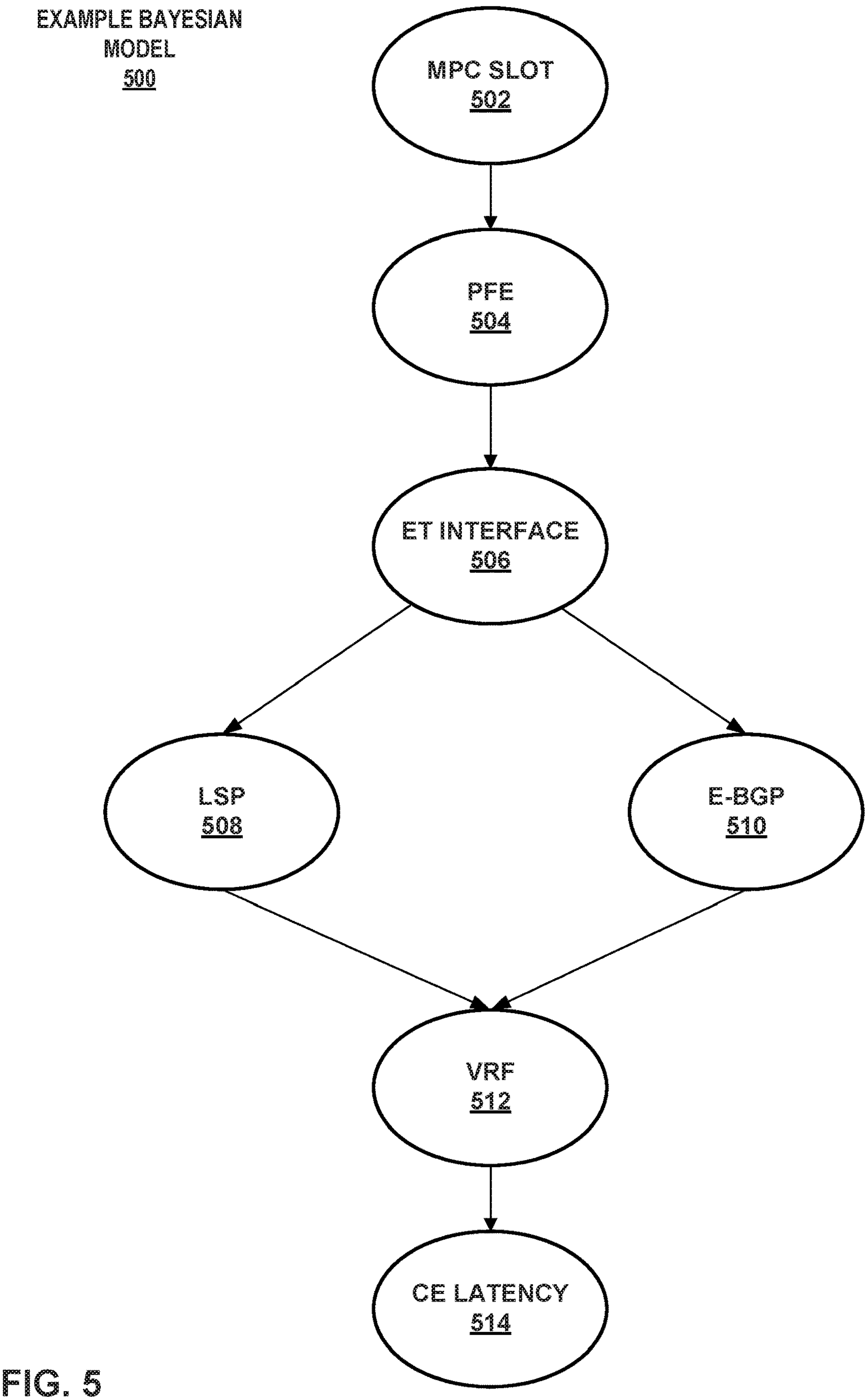
FIG. 5 illustrates an example Bayesian model that may be generated by Bayesian network system based on the example resource dependencies illustrated in resource dependencies graph of FIG. 4, in accordance with one or more aspects of the present disclosure.

FIG. 5 illustrates an example Bayesian model 500 that may be generated by Bayesian network system 204 based on the example resource dependencies illustrated in resource dependencies graph 400 of FIG. 4, in accordance with one or more aspects of the present disclosure. Example Bayesian model 500 includes a node for each type of resource in the resource dependencies model rather that a node for each resource instance. As illustrated in FIG. 5, example Bayesian model 500 includes an MPC slot node 502, PFE node 504, ET interface node 506, LSP node 508, E-BGP node 510, VRF node 512 and CE latency node 514. Each of the nodes in the graph corresponds to a resource type that is representative of all of the resource instances of that type in the dependency model. As a result, Bayesian network system 204 generates a Bayesian model 218 that is less complex and easier to maintain than a model generated including nodes for each instance of a resource. For example, MPC slot node 502 is a type node that represents the resource type for MPC-slots 401A-401D. PFE node 504 is a type node that represents the resource type for PFEs 402A-402C. ET interface node 506 is a type node that represents the resource type for ET interfaces 403A-403D. LSP node 508 is a type node that represents the resource type for LSPs 404A-404C. E-BGP node 510 is a type node that represents the resource type for eBGP services 405A-405C. VRF node 512 is a type node that represents the resource type for VRFs 406A-406C. Finally, CE latency node 514 is a type node that represents the type for events CE latencies 407A-407C. Table 1 illustrates example probabilities associated with VRF 512 for the example Bayesian model 500.

TABLE 1

| LSP | E-BGP | T | F |
|---|---|---|---|
| F | F | 0.0 | 1.0 |
| F | T | 0.8 | 0.2 |
| T | F | 0.9 | 0.1 |
| T | T | 0.99 | 0.01 |

As shown in example Bayesian model 500, VRF 512 is associated with two nodes, LSP 508 and E-BGP 510. The LSP and E-BGP columns of Table 1 indicate whether fault data is present for the corresponding resource, where "T" indicates fault data is present and "F" indicates fault data is not present. The "T" column and "F" column provide the probability that either LSP 508 or E-BGP 510 are root causes for a VRF issue given the four possible combination of fault data for an LSP and E-BGP. Thus, if neither LSP 508 nor E-BGP 510 are indicating a fault, then neither LSP 508 nor E-BGP 510 is a likely root cause of a fault in VRF 512. If LSP 508 is not indicating a fault, but E-BGP 510 is indicating a fault, then there is an 80% probability that E-BGP 510 is the root cause of the fault. If LSP 508 is indicating a fault and E-BGP 510 is not indicating a fault, then there is a 90% probability that LSP 508 is the root cause of the fault in VRF 512. Finally, if both LSP 508 and E-BGP 510 are indicating faults, there is a 99% probability that LSP 508 is the root cause of the fault.

As can be seen by comparing the graphs illustrated in FIG. 3 and FIG. 4, generating a Bayesian model based on types of resource and events rather than instances of resources and events results in a less complex and thus easier to process model. For example, the number of nodes in example Bayesian model 500 (7 nodes) is less than the number of nodes in resource dependencies graph 400 (23 nodes). Thus, the Bayesian model 500 can be evaluated and maintained more efficiently than resource dependency model 400.

Returning to FIG. 2, as noted above, Bayesian model 218 can be a probabilistic graph model. The probability in the Bayesian model can indicate the probability associated with a node that is the type of resource indicated by the node being a root cause for fault data matching the hypothesis. In other words, probability is associated with resource types rather than specific instances of a resource. In some aspects, Bayesian network system 204 generates a Bayesian model 218 where each node is initialized to have an equal probability between the nodes.

The discussion above with respect to FIG. 2 has generally described operational aspects associated with configuring and/or initializing a Bayesian network system 204 for a network health monitor 106 or controller 110. These operational aspects may take place during initialization of network health monitor 106 and/or controller 110. Aspects of the use of Bayesian model 218 by Bayesian network system 204 and/or network health monitor 106 during operation of network 102 will now be discussed.

Network health monitor 106 can receive fault data from devices 114 of network 102 and from controller 110. The fault data can describe events and alarms that may be associated with devices 114 and/or links in network 102 (FIG. 1). Control unit 202 can execute network root cause analyzer 206 and Bayesian network system 204 to analyze the fault data and provide potential root causes for the fault data to an administrator 112, for example, via user interface module 208 and user interface 212.

In some aspects, network health monitor 106 may determine if fault data collection is complete. If fault data collection is complete, then network health monitor 106 may use Bayesian network system 204 to determine one or more root cause hypotheses based on the fault data. If fault data collect is not complete, network health monitor 106 may prolong an observation period and wait for further fault data to arrive. Such data may be referred to as "late-on-arrival" fault data. In some aspects, fault data collection may be considered complete if a resource corresponding to the failed node and a programmable or predetermined percentage of child resources corresponding to child nodes of the failed node report failures. As an example, consider a network system with ten LSPs. Assume that fault data indicating alarms is received from five of the LSPs. It may be the case that there are only five failing LSPs. However, it may also be the case that all ten LSPs are failing, but fault data has not yet been received for the five LSPs that have not yet reported any fault data. Alternatively, a network interface associated with the ten LSPs may have failed and fault data associated with the interface has not yet been reported. In this case, it may be premature to start a root cause analysis because there may be more fault data to be received that can support better or more specific root cause analysis.

Network root cause analyzer 206 can determine if the fault data is sufficiently complete, and if so, generate a set of root cause hypotheses that correspond to the fault data. For example, the set of root cause hypotheses are potential root causes where the fault data matches conditions for the root cause. If the fault data is not complete, network root cause analyzer 206 can extend the observation period and wait for further fault data to arrive. As an example, a failing node may not send alarms for a relatively long time. However, root cause analysis can start at some time after the neighboring nodes detect an outage that may be caused by the failing node. In this case it can be desirable to wait some time for alarms arriving from a dedicated node, but if they do not arrive timely, network root cause analyzer 206 can begin root cause analysis. Root cause analysis may commence once a first failure is received (and many others are yet outstanding). However, since the "fault pattern" is incomplete, root cause analysis may involve considering many possible root cause cases which could be readily rejected if sufficient fault information was available.

Bayesian network system 204 can evaluate a set of root cause hypothesis based on the fault data received by network health monitor 106. Each hypothesis in the set can identify the node or nodes in the Bayesian model 218 that caused the hypothesis to be generated. Bayesian network system 204 can assign a probability to each root cause hypothesis in the generated set of root cause hypotheses using Bayesian model 218. For example, Bayesian network system 204 can compare the fault data with resource and event dependencies to determine a set of potential root cause hypotheses and the probability associated with each root cause hypothesis in the set.

Bayesian network system 204 can cause probes 222 to be executed for the resources indicated in the set of root cause hypotheses. In some aspects, a probe 222 can be used to attempt to disprove a hypothesis. For example, one root cause hypothesis in a set of root cause hypotheses may be "a routing engine may be down if packets are not received from a source node." There may be two possibilities, there may be no packets for the routing engine to forward (which is not a failure) or there may be an internal failure in the routing engine that prevents packets from being forwarded. A probe 222 configured to execute a ping command may be associated with the routing engine resource node in resource dependency model 216. Bayesian network system 204 can execute the probe for the routing engine, e.g., the Bayesian network system can issue the ping command to the routing engine. If a response to the ping command is received, the root cause hypothesis is disproved because the routing engine is operating if a ping response is received. Bayesian network system 204 can thus remove the disproved root cause hypothesis from the set of root cause hypotheses. In this case, the ping probe can be used to distinguish between the case that the routing engine has no packets that need to be forwarded versus an internal failure that prevents packets from being forwarded.

After Bayesian network system 204 has executed probes associated with the resource types and removed any disproved root cause hypotheses from the set of root cause hypotheses, Bayesian network system 204 can rank the remaining root cause hypothesis in the set. In some aspects, the root cause hypotheses may be ranked according to the probabilities assigned in the Bayesian model 218.

In some aspects, network health monitor 106 can utilize user interface module 208 to present the ordered root cause hypotheses to an administrator 112 via user interface 212. In other aspects, network health monitor 106 can utilize network interface module 210 to transmit the ordered root cause hypotheses to another system (e.g., a logging or administrative system) via network interface 214. Administrator 112 can review the root cause hypotheses and determine which, if any, of the root cause hypotheses is correct.

In some aspects, network health monitor 106 may receive feedback from a user (e.g., administrator 112) regarding the set of root cause hypotheses presented to the user in response to a fault in the network. For example, the user may provide feedback that confirms a hypothesis was correct or indicates that a hypothesis was incorrect. In response to the feedback, Bayesian network system 204 may adjust probabilities associated with corresponding root cause hypotheses. For example, in response to receiving feedback that a root cause hypothesis correctly described a fault, Bayesian network system 204 may increase a probability associated with the corresponding root cause hypothesis. Similarly, in response to receiving feedback that a root cause hypothesis was incorrect, Bayesian network system 204 may decrease a probability associated with the corresponding root cause hypothesis. As another example, a user may add a new probe to the resource node in resource model 216 that can assist with verifying a root cause hypothesis associated with the resource type of node. For example, it may be the case that all of the potential root cause hypotheses presented to the user may be incorrect. The user can create a new root cause hypothesis and can pick resource probes that may be used to disprove the hypothesis. The new root cause hypothesis can be added to Bayesian model 218 for example, via user interface 212.

In some aspects, network health monitor 106 can select the most probable root cause hypothesis in the ordered set of root cause hypotheses and automatically perform remedial actions based on the selected root cause hypotheses. For example, if the selected root cause hypothesis indicates that a network node is down, network health monitor 106 may take actions to reset or reboot the network node to bring the network node back to an operational state. The automatic selection of remedial actions may take place after Bayesian model 218 has been sufficiently trained based on the user feedback described above. In other aspects, a Bayesian 218 that has been sufficiently trained on a different network may be imported or installed for use on a current network thereby avoiding the need to train Bayesian model 218 for the current network.

An example of the operation of the above-described system will now be presented. For the purposes of the example, an example network comprises three nodes, N1, N2 and N3. A set of LSPs from N1 to N3 and from N3 to N1 are labeled LSP13 and LSP31 respectively. In this example, a failure causes PFE1 to "forget" the label of LSP13. As a result, network packets of LSP13 are dropped and do not show up on the expected interface counters.

Prior to the failure, a Bayesian model was derived from the resource model and diagnosis model. Probes are associated in the Bayesian network model with available probes in the resource model. In this example, the probes may include ping, BFD, traceroute probes etc.

A symptom of the failure can be that an Ethernet Operation, Administration, and Maintenance (OAM) for an Ethernet Virtual Private Line (EVPL) times out on node N3. When the fault is reported to network health monitor, the network root cause analyzer 206 can determine if the available fault information is complete. In this example, network root cause analyzer 206 can determine if the underlying resources (e.g., resources associated with child resource nodes) have also generated fault data (e.g., alarms). In this example, node N1 can also report an OAM timeout.

Network root cause analyzer 206 can generate multiple root cause hypotheses based on the server resources in the resource dependency model. In addition to the alarms above, the following conditions are present in the network.

1. LDP and BGP do not show errors or anomalies
2. LSP13 and LSP31 are configured and not providing alarms
3. PFE has no alarms
4. Ethernet interface ETH-x has not issued alarms Bayesian network system 204 can rate the hypotheses based on Bayesian model 218. As noted above, in the initial state, each of the resources in the Bayesian model has an equal probability. Bayesian network system 204 can execute probes associated with the resources to attempt to disprove each of the hypotheses. In this example, assume that the probes produce the following results:

1. A probe associated with PFE resources acquires packet forwarding statistics that indicate the PFE is forwarding packets, thus the PFE is operational and a PFE hypothesis that the PFE is the root cause is disproved.
2. A probe associated with node resources pings node N3 from node N1 and vice versa. Both nodes respond to the ping indicating that the ethernet interfaces of the nodes are operational. Thus, nodes N3 and N1 are operational and a root cause hypothesis indicating either node N3 or node N1 is a root cause is disproved.
3. A probe associated with LSP resources pings LSP31. A response to the ping is received indicating that LSP31 is operations. A hypothesis indicating LSP31 as the root cause is therefore disproved.
4. The probe associated with LSP resources pings LSP13. A response to the ping is not received. Thus, a hypothesis indicating that LSP13 is not disproved.

The Bayesian network system 204 ranks the not disproved hypothesis (e.g., LSP13 is root cause) and network health monitor 106 presents the hypotheses in probability order. Network health monitor 106 can seek user input to confirm the hypotheses, perhaps based on manual root cause analysis techniques. In this example, the actual root cause is a malfunctioning PFE and is thus different from the root cause predicted by the Bayesian network system 204 (e.g., LSP13 is down). The user can provide input to select different nodes in the Bayesian model that indicate that the PFE is a potential root case, and can select probes designed to improve the prediction of Bayesian network system 204. The network health monitor 106 can receive this input and modify the Bayesian model 218 and/or resource dependency model 216 accordingly.

Modules illustrated in FIG. 2 (e.g., network health monitor 106, network root cause analyzer 206, Bayesian network system 204, UI module 208, network interface module 210, probes 222A-222N (collectively, "probes 222") and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 6:
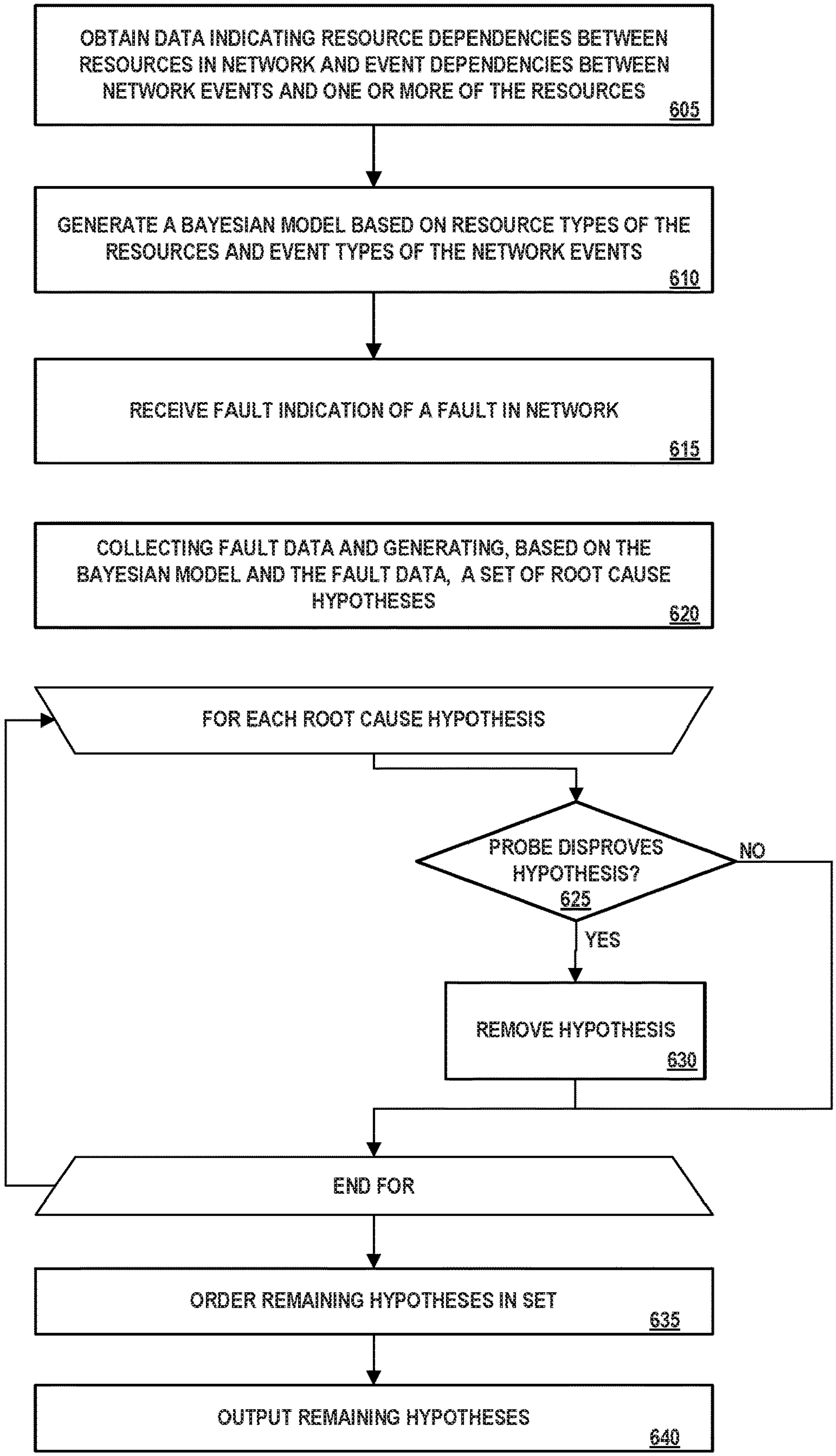
FIG. 6 is a flow diagram illustrating operations performed by an example network health monitor to generate potential root cause hypotheses, in accordance with one or more aspects of the present disclosure.

FIG. 6 is a flow diagram illustrating operations performed by an example network health monitor to generate potential root cause hypotheses, in accordance with one or more aspects of the present disclosure. FIG. 6 is described below within the context of controller 110 and network health monitor 106 of FIG. 1 and FIG. 2. In other examples, operations described in FIG. 6 may be performed by one or more other components, modules, systems, or devices. Further, in other examples, operations described in connection with FIG. 6 may be merged, performed in a difference sequence, performed in parallel, omitted, or may encompass additional operations not specifically illustrated or described.

In the process illustrated in FIG. 6, and in accordance with one or more aspects of the techniques described herein, network health monitor 106 can obtain data indicating resource dependencies between resources in a network and event dependencies between network events and one or more of the resources (605). For example, network health monitor 106 can obtain data indicating resource and event dependences from controller 110.

Network health monitor 106 generates a Bayesian model that is at a higher level than the resource dependency model or diagnosis model (610). For example, nodes in the Bayesian model may be resource types of the resources and event types of network events rather than specific resource instances or event instances.

Network health monitor 106 receives an indication of a fault in the network (615). The indication may be an alarm or event occurring in the network. In response to the indication of the fault, network health monitor 106 collects fault data and, based on the Bayesian model, generates a set of root cause hypotheses (620). The fault data may include data provided as part of the alarm or event that initially indicated the fault in the network.

For each root cause hypothesis in the set, the network health monitor 106 may execute a probe associated with resources identified in the fault data and associated with the root cause hypothesis. In some aspects, the output of the probe can be used to disprove a hypothesis. If the output of the probe disproves the hypothesis (625), then the root cause hypothesis is removed from the set of root cause hypotheses (630, "YES" branch of 625). If the output of the probe does not disprove the hypothesis, the next root cause hypothesis (if any) in the set is obtained ("NO" branch of 625).

The remaining hypotheses in the set of root cause hypotheses can optionally be ordered based on the probability of the root cause hypotheses as determined by the Bayesian model (635). The set of remaining root cause hypotheses can be output (640). For example, the set of remaining hypotheses can be displayed via a user interface to a user.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/ or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, or wireless technologies such as infrared, radio, and microwave, then the coaxial cable, fiber optic cable, twisted pair, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above could also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:

obtaining, by one or more processors, data indicating resource dependencies between a plurality of resources in a network and event dependencies between a plurality of network events and one or more of the plurality of resources;

generating a Bayesian model based on resource types of the plurality of resources and event types of the plurality of network events, each of the plurality of resources in the network representing an instance of one of the resource types;

receiving an indication of a fault in the network;

collecting fault data and generating, based on the Bayesian model and the fault data, a plurality of root cause hypotheses for the fault, wherein each root cause hypothesis of the plurality of root cause hypotheses is associated with a resource type of the resource types, and wherein each of the plurality of root cause hypotheses has an associated probability;

determining, for a resource of the plurality of resources in the network, wherein the resource is an instance of a resource type associated with one of the root cause hypotheses of the plurality of root cause hypotheses, a probe associated with the resource type associated with the one of the root cause hypotheses, wherein a definition for the probe specifies one or more networking commands to be issued to at least one resource of the plurality of resources that result in receiving at least one value from the at least one resource, and wherein the probe further specifies one or more conditions for the at least one value that, when triggered by the probe, disprove the root cause hypothesis;

executing the probe, including issuing the one or more networking commands to the at least one resource, and, in response to determining that the probe disproves the root cause hypothesis, removing the root cause hypothesis from the plurality of root cause hypotheses to form an updated plurality of root cause hypotheses;

adjusting the probabilities associated with the updated plurality of root cause hypotheses based on the probability of the root cause hypothesis that was removed;

ordering the updated plurality of root cause hypotheses based on the adjusted probabilities associated with the updated plurality of root cause hypotheses to form an ordered plurality of root cause hypotheses; and outputting the ordered plurality of root cause hypotheses.

2. The method of claim 1, wherein the definition for the probe includes at least one argument for the probe.

3. The method of claim 1, further comprising determining whether the fault data is complete; and in response to determining that the fault data is complete, waiting a first time period and, after the first time period has elapsed, generating the plurality of root cause hypotheses.

4. The method of claim 3, further comprising:

in response to determining that the fault data is not complete, waiting a second time period longer than the first time period and, after the second time period has elapsed, generating the plurality of root cause hypotheses.

5. The method of claim 3, wherein determining that the fault data is complete comprises determining that a threshold percentage of child resources have provided fault information, wherein the child resources correspond to child nodes of a resource node in a resource dependency model and the resource node corresponds to a resource that provided the fault data.

6. The method of claim 1, further comprising:

receiving a confirmation of a root cause hypothesis of the plurality of root cause hypotheses; and increasing a probability associated with each node corresponding to the confirmed root cause hypothesis.

7. The method of claim 1, further comprising:

receiving a user-generated root cause hypothesis of the plurality of root cause hypotheses;

receiving an indication of a probe associated with the user-generated root cause hypothesis; and adding the user-generated root cause hypothesis to the Bayesian model.

8. The method of claim 7, wherein the probe associated with the user-generated root cause hypothesis comprises a new probe, and wherein the method further comprises receiving a mapping of resource properties of a resource node to inputs of the new probe.

9. The method of claim 1, further comprising initializing a probability associated with each node of the Bayesian model to an equal probability.

10. A system comprising:

a memory; and processing circuitry configured to:

obtain data indicating resource dependencies between a plurality of resources in a network and event dependencies between a plurality of network events and one or more of the plurality of resources;

generate a Bayesian model based on resource types of the plurality of resources and event types of the plurality of network events, each of the plurality of resources in the network representing an instance of one of the resource types;

receive an indication of a fault in the network;

collect fault data and generating, based on the Bayesian model and the fault data, a plurality of root cause hypotheses for the fault, wherein each root cause hypothesis of the plurality of root cause hypotheses is associated with a resource type of the resource types, and wherein each of the plurality of root cause hypotheses has an associated probability;

determine, for a resource of the plurality of resources in the network, wherein the resource is an instance of a resource type associated with one of the root cause hypothesis of the plurality of root cause hypotheses, a probe associated with the resource type associated with the one of the root cause hypotheses, wherein a definition for the probe specifies one or more networking commands to be issued to at least one resource of the plurality of resources that result in receiving at least one value from the at least one resource, and wherein the probe further specifies one or more conditions for the at least one value that, when triggered by the probe, disprove the root cause hypothesis;

execute the probe, including issuing the one or more networking commands to the at least one resource, and, in response to determining that the probe disproves the root cause hypothesis, removing the root cause hypothesis from the plurality of root cause hypotheses to form an updated plurality of root cause hypotheses;

adjust the probabilities associated with the updated plurality of root cause hypotheses based on the probability of the root cause hypothesis that was removed;

order the updated plurality of root cause hypotheses based on the adjusted probabilities associated with the updated plurality of root cause hypotheses to form an ordered plurality of root cause hypotheses; and output the ordered plurality of root cause hypotheses.

11. The system of claim 10, wherein the definition for the probe includes at least one argument for the probe.

12. The system of claim 10, wherein the processing circuitry is further configured to:

determine whether the fault data is complete; and in response to a determination that the fault data is complete, wait a first time period and after the first time period has elapsed, generate the plurality of root cause hypotheses after a first time period has elapsed.

13. The system of claim 12, wherein the processing circuitry is further configured to:

in response to a determination that the fault data is not complete, wait a second time period longer than the first time period and, after the second time period has elapsed, generate the plurality of root cause hypotheses.

14. The system of claim 12, wherein to determine that the fault data is complete comprises to determine that a threshold percentage of child nodes have provided fault information.

15. The system of claim 10, wherein the processing circuitry is further configured to:

receive a confirmation of a root cause hypothesis of the plurality of root cause hypotheses; and increase a probability associated with each node corresponding to the confirmed root cause hypothesis.

16. The system of claim 10, wherein the processing circuitry is further configured to:

receive a user-generated root cause hypothesis of the plurality of root cause hypotheses;

receive an indication of a probe associated with the user-generated root cause hypothesis; and add the user-generated root cause hypothesis to the Bayesian model.

17. The system of claim 16, wherein the probe associated with the user-generated root cause hypothesis comprises a new probe, and wherein the processing circuitry is further configured to receive a mapping of resource properties of a resource node to inputs of the new probe.

18. The system of claim 10, wherein the processing circuitry is further configured to initialize a probability associated with each node of the Bayesian model to an equal probability.

19. A non-transitory computer-readable storage medium having stored thereon instructions, that when executed, cause one or more processors to:

obtain data indicating resource dependencies between a plurality of resources in a network and event dependencies between a plurality of network events and one or more of the plurality of resources;

generate a Bayesian model based on resource types of the plurality of resources and event types of the plurality of network events, each of the plurality of resources in the network representing an instance of the one of the resource types;

receive an indication of a fault in the network;

collect fault data and generating, based on the Bayesian model and the fault data, a plurality of root cause hypotheses for the fault, wherein each root cause hypothesis of the plurality of root cause hypotheses is associated with a resource type of the resource types, and wherein each of the plurality of root cause hypotheses has an associated probability;

determine, for a resource of the plurality of resources in the network, wherein the resource is an instance of a resource type associated with one of the root cause hypotheses of the plurality of root cause hypotheses, a probe associated with the resource type associated with the one of the root cause hypotheses, wherein a definition for the probe specifies one or more networking commands to be issued to at least one resource of the plurality of resources that result in receiving at least one value from the at least one resource, and wherein the probe further specifies one or more conditions for the at least one value that, when triggered by the probe, disprove the root cause hypothesis;

execute the probe, including issuing the one or more networking commands to the at least one resource, and, in response to determining that the probe disproves the root cause hypothesis, removing the root cause hypothesis from the plurality of root cause hypotheses to form an updated plurality of root cause hypotheses;

adjust the probabilities associated with the updated plurality of root cause hypotheses based on the probability of the root cause hypothesis that was removed;

order the updated plurality of root cause hypotheses based on the adjusted probabilities associated with the updated plurality of root cause hypotheses to form an ordered plurality of root cause hypotheses; and output the ordered plurality of root cause hypotheses.

20. The non-transitory computer-readable storage medium of claim 19, wherein the definition for the probe includes at least one argument for the probe.

* * * * *

UNITED STATES PATENT AND TRADEMARK OFFICE

CERTIFICATE OF CORRECTION

PATENT NO. : 11,888,679 B2
APPLICATION NO. : 17/032799
DATED : January 30, 2024
INVENTOR(S) : Grammel et al.

It is certified that error appears in the above-identified patent and that said Letters Patent is hereby corrected as shown below:

In the Claims

Column 20, Lines 48-49 (Claim 10): Replace "one of the root cause hypothesis" with -- one of the root cause hypotheses --.

Signed and Sealed this
Twenty-fifth Day of March, 2025

Coke Morgan Stewart
*Acting Director of the United States Patent and Trademark Office*